April 20, 1937.  L. F. SIELA  2,078,102
ROLL OR BUN BAKING PAN
Filed Nov. 4, 1936    2 Sheets-Sheet 1

Leo F. Siela, INVENTOR
BY Victor J. Evans & Co.
ATTORNEYS

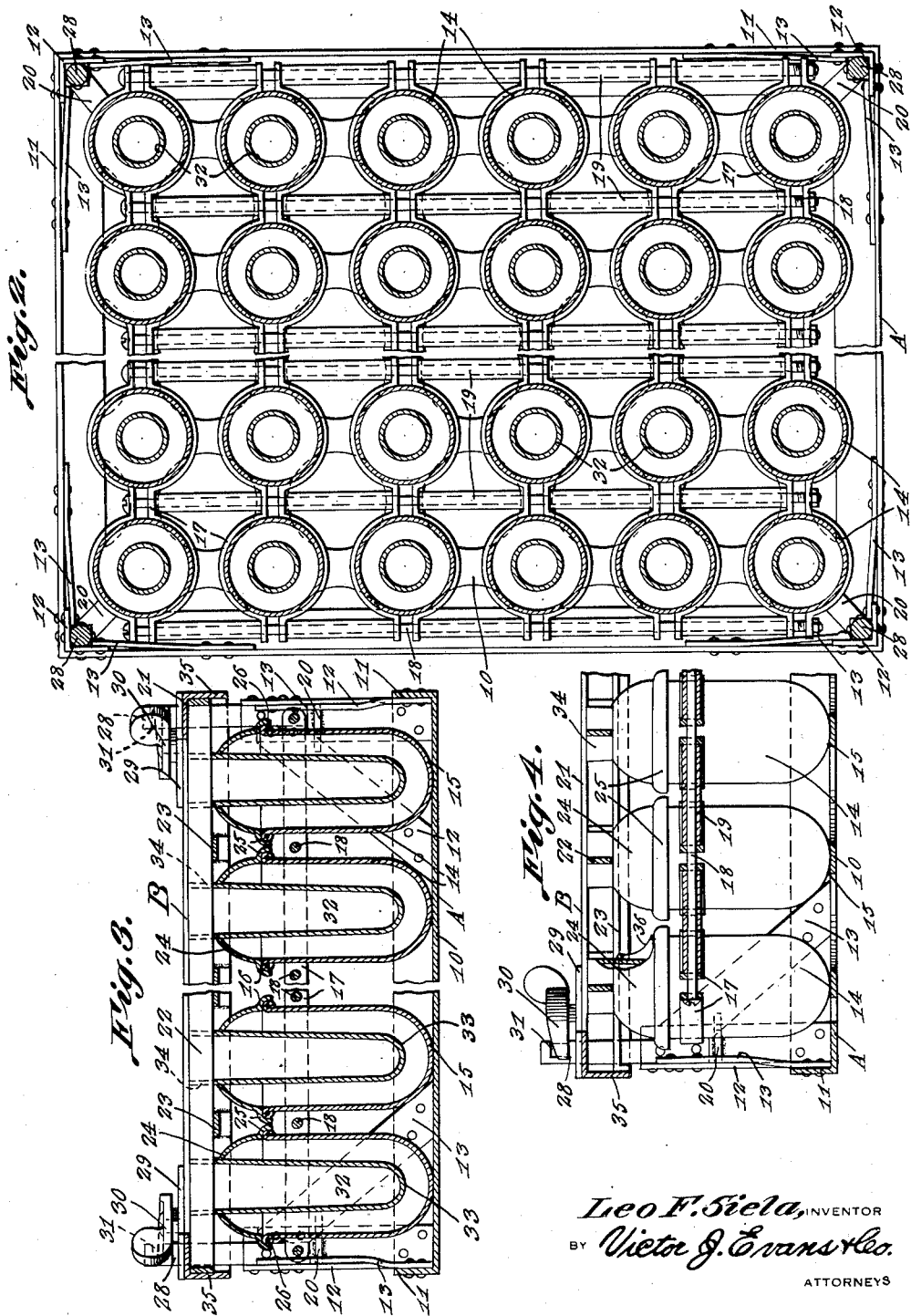

Patented Apr. 20, 1937

2,078,102

UNITED STATES PATENT OFFICE 2,078,102

ROLL OR BUN BAKING PAN

Leo F. Siela, Bluffton, Ind.

Application November 4, 1936, Serial No. 109,150

6 Claims. (Cl. 53—6)

The invention relates to a roll or bun baking pan and more especially to a pan for making sandwich rolls commonly called frankfurter sandwich rolls or buns.

The primary object of the invention is the provision of a pan of this character, wherein through the use of a group of molds, both inside and outside parts thereof, rolls or buns for accommodating frankfurters can be conveniently baked and in this manner eliminating the necessity of slicing or cutting the rolls or buns for the introduction of the frankfurter in the making of sandwich buns or rolls.

Another object of the invention is the provision of a pan of this character, wherein the mold sections are carried in a novel manner so that rolls or buns may be baked uniformly and in the baking suitable pockets or recesses will be created therein for the reception of frankfurters as well as a relish or sauce to be served with the sandwich if found desirable.

A further object of the invention is the provision of a pan of this character, wherein heat may freely circulate therethrough when baking buns or rolls for uniform baking operation in the making of sandwich rolls or buns.

A further object of the invention is the provision of a pan of this character, which is simple in its construction, thoroughly reliable and effective in its operation, susceptible of easy cleaning, assuring the baking of a number of buns or rolls at one time, strong, durable, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 2 is a top plan view of the said pan with the top removed.

Figure 3 is a sectional view on the line 3—3 of Figure 1 looking in the direction of the arrows.

Figure 4 is a fragmentary vertical sectional view through the pan showing the top unlatched for the removal thereof, taken on the line 4—4 of Figure 1 looking in the direction of the arrows.

Similar reference characters indicate corresponding parts throughout the several views in the drawings.

Figure 1:
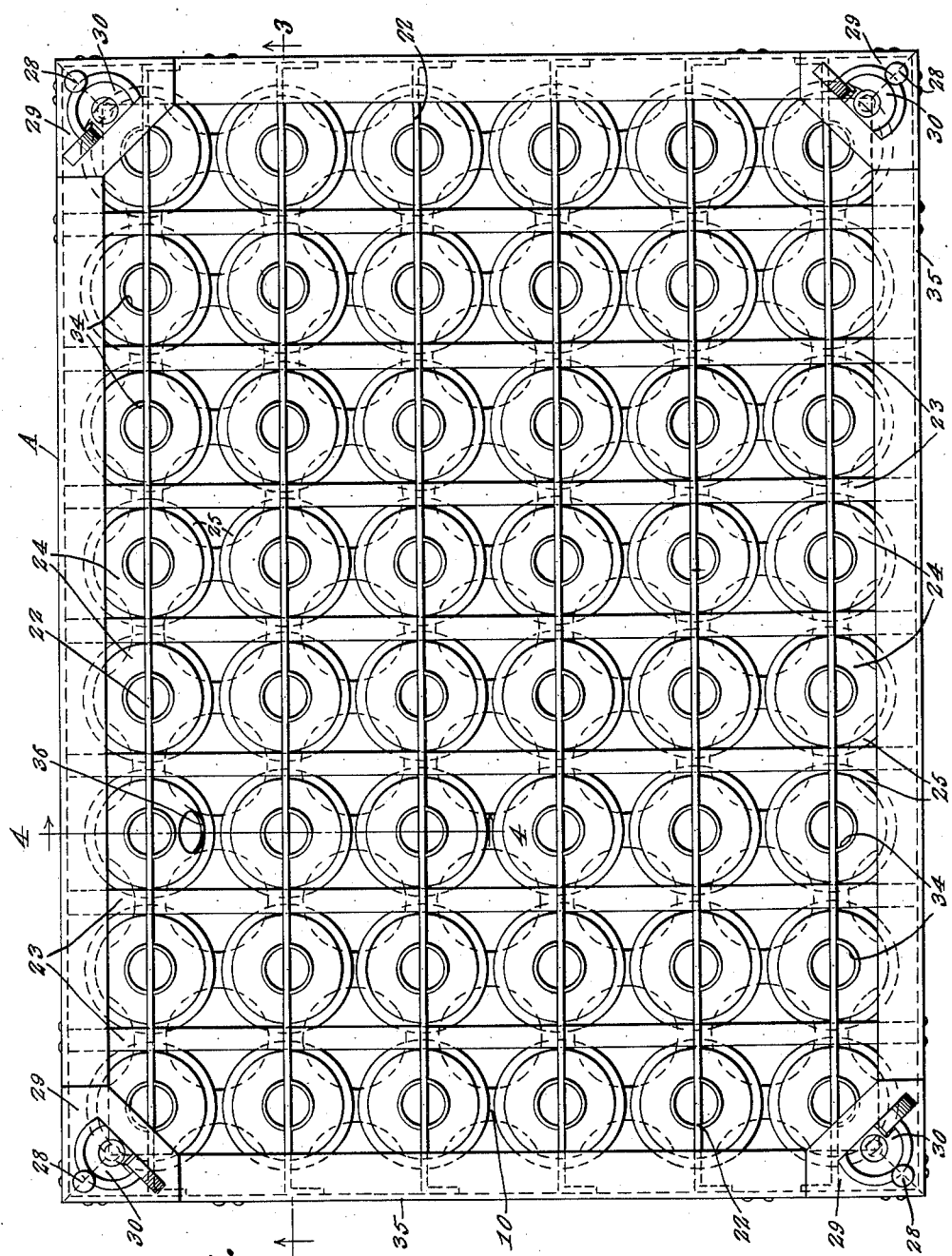
Figure 1 is a top plan view of the pan constructed in accordance with the invention.

Referring to the drawings in detail, the pan constituting the present invention comprises a body unit A and a top unit B, respectively. This body unit A is formed with a perforated bottom section 10 having an upstanding marginal side and end flange formation 11 while at the corners of said bottom section 10 are vertical corner posts 12 which have joined therewith diagonal braces 13, the same being joined to the flange formation 11 of the bottom section 10 to maintain rigidity to the body unit A.

Nested within the body unit A is a group of outer roll or bun forming molds 14, these having rounded bottoms 15 and upper open mouths 16. The outer molds 14 are arranged in spaced vertical and transverse rows within the body unit A and are held in an upright position between pairs of clamping straps 17 which are held upon tie rods 18 carrying spacer sleeves 19 for holding the pairs of straps 17 uniformly spaced when engaged with the rods 18, these also functioning to clamp the straps in encircling relation about the molds 14 which in the group or series thereof are removably held within the body unit A with the bottoms 15 resting upon the bottom 10 of said unit.

At the corner posts 12 and diagonally extended inwardly therefrom are abutment portions 20 which hold the nest or group of molds 14 centered within the body unit A when within the latter.

The top unit B is in the form of an open center frame 21 carrying longitudinally disposed spaced parallel suspension or hanger bars 22 and spaced parallel transversely disposed brace pieces 23 for these bars. The bars 22 have fixed thereto and hung or suspended therefrom covers or lids 24 adapted to register with the open mouths 16 of the molds 14 when the top unit B is placed upon or over the body unit A. These covers or lids 24 have annular rims 25 for telescoping over the mouths 16, the latter being formed with rolled or beaded edges 26 adapted to be seated in the rims 25 when said molds 14 are closed by these covers or lids.

The posts 12 of the body unit A carry latching bolts 28 which are fixed perpendicularly thereto and are received in clearances or holes provided in corner reinforcements 29 on the top unit B when the latter is superimposed upon the body unit for the fitting of the covers or lids 24 upon the molds 14. The reinforcements 29 have pivotally mounted therein swinging finger operated latching cams 30 which engage in notches 31 provided in the bolts 28 so that the top unit B can be firmly fastened upon the body unit with the covers or lids locked down upon the open mouths 16 of the mold 14 with the rims 25 telescoped over the beads or rolled edges 26 of the said molds.

Formed with the covers or lids 24 are centrally depending inner coring molds 32, these being downwardly tapered and are adapted to extend a determined distance within the outer molds 14 so that in the baking of rolls or buns within these outer molds 14 in the use of the pan such rolls or buns will have formed therein a center cavity or space adapted for accommodating frankfurters and a relish if desirable to serve with the frankfurters and in this manner producing frankfurter sandwich rolls or buns. The cavities or spaces centrally formed in the rolls or buns open through one end of each so that the frankfurter can be conveniently inserted therein after the baking of the roll or bun in the pan. Each coring mold 32 is of hollow tubular formation having a rolled closed end 33 and a transversely split open end 34, respectively, this split end is suitably united with the hanger or suspension bars 22 as is clearly shown in Figures 1, 3 and 4 of the drawings so that the inner molds will be rigidly held and made a part of the top unit B.

The dough for the production of the bun or roll is introduced into the outer molds 14, the top unit B being entirely removed for this purpose. Thereafter the top unit B is placed in position over the body unit A to have the covers or lids 24 close the mouths 16 of the molds 14 and the inner molds 32 extended centrally within these molds 14. When the pan with the dough in the molds 14 is placed within an oven heat will freely circulate about the said molds in the group or nest arrangement thereof within the body unit A for uniform baking of the rolls or buns.

The body unit A and the top unit B are of open formation so that heat circulation with uniformity is assured in the use of the pan.

The pan can be readily cleaned as well as the molds 14 and 32 and the covers 24 for said molds 14 with ease and dispatch for sanitary purposes.

The frame 21 of the top unit B has a side and end flange formation 35 to which the bars 22 and straps 23 are attached.

It is preferable to have one of the covers or lids 24 provided with a peep hole 36 to enable inspection of the mold 14 content during the baking period of the rolls or buns to avoid the possibility of overbaking of the latter.

What is claimed is:

1. A pan of the character described comprising a body unit, a removable top unit, a plurality of roll forming outer molds nested within the body unit and open at their tops, covers carried by the top unit for closing the open tops of said outer molds, and inner cavity forming molds depending from the covers for protection centrally within the said outer molds when the covers are closing the open tops of the said outer molds.

2. A pan of the character described comprising a body unit, a removable top unit, a plurality of roll forming outer molds nested within the body unit and open at their tops, covers carried by the top unit for closing the open tops of said outer molds, inner cavity forming molds depending from the covers for protection centrally within the said outer molds when the covers are closing the open tops of the said outer molds, and means clamping the outer molds in spaced, transverse and longitudinal rows.

3. A pan of the character described comprising a body unit, a removable top unit, a plurality of roll forming outer molds nested within the body unit and open at their tops, covers carried by the top unit for closing the open tops of said outer molds, inner cavity forming molds depending from the covers for protection centrally within the said outer molds when the covers are closing the open tops of the said outer molds, means clamping the outer molds in spaced, transverse and longitudinal rows, latching bolts rising from the body section and engaged through the top section, and means on the top section for wedging engagement with the bolts to fasten the top section upon the body section with the covers closing the open tops of said outer molds.

4. A pan of the character described comprising a body unit, a removable top unit, a plurality of roll forming outer molds nested within the body unit and open at their tops, covers carried by the top unit for closing the open tops of said outer molds, inner cavity forming molds depending from the covers for protection centrally within the said outer molds when the covers are closing the open tops of the said outer molds, means clamping the outer molds in spaced, transverse and longitudinal rows, latching bolts rising from the body section and engaged through the top section, and means on the top section for wedging engagement with the bolts to fasten the top section upon the body section with the covers closing the open tops of said outer molds, the said body section and top section being of skeleton formation.

5. A pan of the character described comprising a body unit, a removable top unit, a plurality of roll forming outer molds nested within the body unit and open at their tops, covers carried by the top unit for closing the open tops of said outer molds, inner cavity forming molds depending from the covers for protection centrally within the said outer molds when the covers are closing the open tops of the said outer molds, means clamping the outer molds in spaced, transverse and longitudinal rows, latching bolts rising from the body section and engaged through the top section, means on the top section for wedging engagement with the bolts to fasten the top section upon the body section with the covers closing the open tops of said outer molds, the said body section and top section being of skeleton formation, and means in the top section for suspending the covers and said inner molds.

6. A pan of the character described comprising a body unit, a removable top unit, a plurality of roll forming outer molds nested within the body unit and open at their tops, covers carried by the top unit for closing the open tops of said outer molds, inner cavity forming molds depending from the covers for protection centrally within the said outer molds when the covers are closing the open tops of the said outer molds, means clamping the outer molds in spaced, transverse and longitudinal rows, latching bolts rising from the body section and engaged through the top section, means on the top section for wedging engagement with the bolts to fasten the top section upon the body section with the covers closing the open tops of said outer molds, the said body section and top section being of skeleton formation, means in the top section for suspending the covers and said inner molds, and means within the body section for centering the nested outer molds therein.

LEO F. SIELA.